Patented May 16, 1933

1,909,080

UNITED STATES PATENT OFFICE

CLAUSS BURKART STRAUCH, OF McGREGOR, MINNESOTA

LUBRICATING AND COOLING MATERIAL

No Drawing.  Application filed April 25, 1929.  Serial No. 358,163.

This invention relates to a lubricant and has particular reference to a lubricant which is exposed during use to such temperatures as would normally cause the lubricant to be deteriorated by heat, such for example as in an internal combustion engine and in cutting tools.

When a lubricant is applied to a surface having an elevated temperature or when it is exposed to such temperatures, there is a tendency of the lubricant to burn, give off smoke and to thin out in such a way as to reduce its lubricating property. In an internal combustion engine, for example, the cylinder walls become highly heated and when the crank case oil comes into contact with the heated surfaces, notably in the combustion chamber and during the explosion periods, a portion of the oil will burn up and generate an objectionable smoke, while other portions of the oil when thus heated are thinned out so that they lose their lubricating property and, in addition, no longer serve as a seal between the cylinder wall and the piston, and thus reduce the efficiency of the motor by permitting the explosion gases to escape.

A further disadvantage of known lubricating oils arises from their use in circumstances where water is unavoidably added to the oil, and mechanically commingles therewith. Thus, during the operation of a steam engine, water is constantly being added to the lubricating oil, and such free water in the oil reduces the efficiency of the lubricant and causes the production of an unstable oil-in-water emulsion which has small lubricating properties and causes much loss of oil. It is necessary to frequently drain the oil solely for the purpose of mechanically separating the water and the oil and restore the latter to a usable condition. Although many satisfactory lubricating oils are now available, insofar as I am aware, there is none which is not open to the objections referred to.

A general object of the present invention is to produce a lubricating material which possesses superior lubricating qualities and at the same time is capable of resisting burning and thinning out when exposed to elevated temperatures.

A further object is to produce a lubricant which has a tendency to cool itself when its temperature is raised to the deteriorating or burning point.

Another object of the invention is to produce a lubricating substance whose efficiency as a lubricant will not be affected by contact with water, and which will be capable either of permanently absorbing commingled water or, when saturated, to refuse to form an emulsion therewith.

A still further object is to produce a new lubricating material which may be readily and cheaply compounded from simple, well-known, and cheap substances.

These and other objects of the invention will be apparent from the following specification and will be pointed out in the appended claims.

The present invention contemplates the use of a water-oil emulsion as a lubricant and cooling medium. There are two general classes of emulsions, the "oil-in-water" and the "water-in-oil" types. In the oil-in-water emulsion, drops of oil are distributed throughout a body of water; the water is on the outside and surrounds the oil drops. Such oil-in-water emulsions are readily diluted with water and possess little lubricating properties unless the proportion of water is extremely small as compared with the oil. The water which constitutes the outside of the substance is the dominating and effective element.

In the second class of emulsions, the water-in-oil type, drops of water are distributed throughout a body of oil. Here, the oil, is the body substance which surrounds and forms a film about the water drops.

Each type of emulsion referred to is produced by the use of an "emulsifying agent", a single substance or mixture of different substances. While many emulsifying agents are known which create a certain degree of emulsification for either one of the two types, it has been difficult to create a permanent and perfect water-in-oil emulsion through the addition of simple and well-known emulsifying agents.

I have discovered that a permanent water-in-oil emulsion may be used as a lubricating medium with most unexpected results. A perfect water-in-oil emulsion lubricant possesses lubricating qualities equal or superior to pure oil. In such a lubricant, the amount of oil present, as compared with pure oil lubricants, is relatively small, and consequently when the lubricant is used, for example in an internal combustion engine, only a small portion of oil is exposed to the elevated temperatures existing in the combustion chamber, with the result that comparatively little oil is exposed to burning. Therefore, even should the lubricant burn or deteriorate as easily as pure oil lubricants when exposed to the same heat conditions, the present lubricant has a decided advantage of subjecting a lesser quantity of oil to the danger of burning. In fact, however, the water-in-oil emulsion lubricant does not burn or thin out so easily as compared with pure oil, and the value of such characteristics will be readily appreciated. When the lubricant is heated to a point at which pure oil would be burned, the water present in the emulsion is converted into steam, and such conversion results in a lowering of the temperature of the oil. As my lubricant does not easily burn, its use does not result in the production of smoke, a most undesirable characteristic of pure oil lubricants. Neither does the use of the lubricant result in the fouling of spark plugs by the deposition of carbon.

When pure oil is elevated to high temperatures, it becomes quite thin and this is a disadvantage in internal combustion engines wherein the oil forms a seal against the escape of the explosion gases between the piston and the cylinder wall. A water-in-oil emulsion does not become so thin, and therefore its use as a lubricant in an internal combustion engine has the further advantage of maintaining a satisfactory seal even at the existing elevated temperatures.

Under certain conditions, such as in the operation of a steam engine, water is constantly and unavoidably added to the lubricating oil by condensation in the engine. Such added water will have the tendency to form an oil-in-water emulsion which has not much lubricating quality, and therefore it is necessary in steam engine operation to periodically drain the oil and separate the water therefrom, or add a new supply of oil. It will thus be evident that the addition of water, intentionally or unavoidably to a pure oil lubricant is most harmful. The disadvantage referred to is entirely eliminated by the use of my water-in-oil emulsion as a lubricant in a steam engine. If the lubricant is not originally saturated with water, it will absorb or permanently take into itself the water added to it during the engine operation. If, on the other hand, the lubricant is incapable of taking up additional water, the added water will remain in a free state.

A lubricant formed by a water-in-oil emulsion such as contemplated by the present invention has especial advantages when applied to a cutting tool, and in this connection has proven far superior, both in its lubricating and cooling functions, to prior lubricants. To accomplish the desired purpose, a lubricant must form a film upon the cutting tool, and the efficiency of the lubricant will depend upon the strength of the film and the difficulties with which it is broken. When the protective oil film breaks, the lubricating function is interrupted. Heretofore, it has been proposed to use an oil-in-water emulsion to lubricate cutting tools. However, such an emulsion is valuable chiefly because of its cooling function, rather than its lubricating qualities. As the body substance is water, and the water is on the outside and in contact with the cutting surfaces, lubrication is secured only when the oil globules are dispersed and brought in contact with the cutting surfaces, a difficult thing to accomplish in view of the external water layer and then only periodically. With my improved water-in-oil lubricant, in which the oil is on the outside, the cutting surface becomes coated with a film of oil, which has a reduced surface tension owing to the presence of water in oil emulsifiers. As in the oil-in-water emulsions, my lubricant also has sufficient water present to accomplish the desired cooling function.

My permanent water-in-oil emulsion which forms the lubricant of the present invention may be produced by the use of many emulsifying agents, and I do not wish to be limited to any particular one. As an example of satisfactory emulsifying agents which will form a permanent emulsion, asphalt and rubber, or asphalt and solvent such as gasoline or ether may be employed. For example, an emulsion may be formed by adding 1% of asphalt and 0.4% of rubber to a mixture of water and refined mineral oil and agitating the mixture. Instead of water, glycerin or glycol or mixtures of water with this or other substances may always be used. By the use of such agents, the oil is capable of permanently absorbing three times its volume of water. Emulsification can be accomplished by any of the well-known methods, such as violent shaking, grinding, stirring, or by throwing the mixture against baffles or other perforated walls.

The emulsion may be thinned to any desired consistency by the addition of a suitable oil solvent, such as gasoline or ether, and may be made more viscous by addition of water. This ability to regulate the viscosity of the lubricant is quite important to meet the various demands to which the lubricant may be placed, and is a distinct property of water-in-oil emulsions as contracted with the oilin-water type. The presence of a suitable oil solvent will not affect the stability of the lubricant, but, on the other hand, it increases the power of the oil to absorb water.

Having thus described my invention, what I claim as new and desire to secure by Letters Patent of the United States is:

1. A lubricating and cooling substance comprising a permanent water-in-oil emulsion, wherein water is present in sufficient quantity to cool the oil when the substance is exposed to such elevated temperatures as would normally reduce the lubricating property of the oil, and an emulsifying agent comprising rubber and asphalt.

2. A lubricating and cooling medium which comprises a permanent water-in-oil emulsion in which the amount of water present is at least thirty percent, and an emulsifying agent selected from the group which consists of asphalt and rubber, and asphalt and a suitable solvent.

3. A lubricating and cooling medium formed by a permanent water-in-oil emulsion which consists of water, oil, asphalt, and rubber.

4. A lubricating and cooling medium comprising a permanent water-in-oil emulsion, formed by adding substantially 1% of asphalt and substantially 0.4% of rubber to a mixture of water and refined mineral oil, and then agitating the mixture.

5. A lubricating and cooling medium comprising a permanent glycerin-in-oil emulsion, wherein the glycerin maintains and protects the oil film against excessive heating, and an emulsifying agent selected from the group which consists of asphalt and rubber, and asphalt and a suitable solvent.

6. A lubricating and cooling medium comprising a permanent glycol-in-oil emulsion, wherein the glycol maintains and protects the oil film against excessive heating, and an emulsifying agent selected from the group which consists of asphalt and rubber, and asphalt and a suitable solvent.

7. A lubricating and cooling medium which comprises a permanent emulsion wherein oil constitutes the external phase and the internal phase comprises a material selected from the group which consists of water, glycol, and glycerine, said emulsion containing an emulsifying agent selected from the group which consists of asphalt and rubber, and asphalt and a suitable solvent.

8. A lubricating and cooling medium which comprises a permanent emulsion of a liquid in oil, and an emulsifying agent comprising rubber and asphalt.

In testimony whereof, I affix my signature.

CLAUSS BURKART STRAUCH.